US010634597B2

(12) United States Patent
Klasner et al.

(10) Patent No.: US 10,634,597 B2
(45) Date of Patent: Apr. 28, 2020

(54) METHOD AND APPARATUS FOR SELECTING SURFACTANTS

(71) Applicant: Halliburton Energy Services, Inc., Houston, TX (US)

(72) Inventors: Scott Anthony Klasner, Spring, TX (US); Kurt William Hoeman, Houston, TX (US); Denise Nicole Benoit, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 287 days.

(21) Appl. No.: 15/544,231

(22) PCT Filed: Mar. 31, 2015

(86) PCT No.: PCT/US2015/023625
§ 371 (c)(1),
(2) Date: Jul. 17, 2017

(87) PCT Pub. No.: WO2016/159982
PCT Pub. Date: Oct. 6, 2016

(65) Prior Publication Data
US 2017/0370816 A1 Dec. 28, 2017

(51) Int. Cl.
*G01N 13/02* (2006.01)
*C09K 8/60* (2006.01)
*C09K 8/03* (2006.01)
*G01N 30/90* (2006.01)

(52) U.S. Cl.
CPC ............... *G01N 13/02* (2013.01); *C09K 8/03* (2013.01); *C09K 8/602* (2013.01); *G01N 30/90* (2013.01)

(58) Field of Classification Search
CPC .......... G01N 13/02; G01N 30/90; C09K 8/03; C09K 8/602
See application file for complete search history.

(56) References Cited

U.S. PATENT DOCUMENTS

| 2007/0122819 | A1* | 5/2007 | Wu | B01L 3/502746 |
| | | | | 435/6.11 |
| 2010/0159599 | A1* | 6/2010 | Song | A61F 13/42 |
| | | | | 436/39 |
| 2010/0159611 | A1* | 6/2010 | Song | A61B 10/007 |
| | | | | 436/163 |

(Continued)

FOREIGN PATENT DOCUMENTS

| WO | 2013096714 A1 | 6/2013 |
| WO | 2014014587 A2 | 1/2014 |

OTHER PUBLICATIONS

Klasner, Scott A. et al., Paper-based microfluidic devices for analysis of clinically relevant analytes present in urine and saliva, Anal Bioanal Chem (2010) 397:1821-1829, published online Apr. 28, 2010, Springer-Verlag 2010.

*Primary Examiner* — Randy W Gibson
*Assistant Examiner* — Gedeon M Kidanu
(74) *Attorney, Agent, or Firm* — McAfee & Taft

(57) ABSTRACT

This present application relates generally to a testing device for selecting a surfactant during oilfield subterranean operation technologies. More specifically, the application relates to providing a testing device for selecting a surfactant depending on the interaction of the surfactant with a combination of variables, including the formation hydrocarbon, source water and formation mineralogy.

20 Claims, 5 Drawing Sheets

(56) References Cited

U.S. PATENT DOCUMENTS

| | | | |
|---|---|---|---|
| 2011/0112815 A1 | 5/2011 | Stukan et al. | |
| 2011/0123398 A1* | 5/2011 | Carrilho | B01L 3/5023 |
| | | | 422/68.1 |
| 2012/0171702 A1* | 7/2012 | Shen | G01N 33/52 |
| | | | 435/7.92 |
| 2013/0067999 A1 | 3/2013 | Xu et al. | |
| 2013/0341188 A1* | 12/2013 | Sabate Vizcarra | H01M 8/1009 |
| | | | 204/409 |
| 2014/0137792 A1 | 5/2014 | Ward et al. | |
| 2015/0107709 A1* | 4/2015 | Peng | B01L 3/50273 |
| | | | 137/806 |
| 2015/0132742 A1* | 5/2015 | Thuo | B01L 3/502707 |
| | | | 435/5 |

* cited by examiner

METHOD AND APPARATUS FOR SELECTING SURFACTANTS

FIELD OF INVENTION

This present application relates generally to systems and methods for oilfield subterranean operation technologies.

BACKGROUND

To produce oil or gas from a reservoir, a wide variety of oilfield subterranean operations include the use of a surfactant. Such operations include, but are not limited to, drilling operations, stimulation treatments (e.g., fracturing treatments, acidizing treatments), and completion operations (e.g., sand control treatments). In these subterranean operations, surfactants may be used for a number of purposes, such as emulsifying agents, non-emulsifying agents, foaming agents, defoaming agents, viscosifying (e.g., gelling) agents, dispersants, wetting agents, and the like.

Surfactant selection is costly and time consuming, usually requiring access to a regional laboratory or field lab. Surfactant selection has also been shown to have a significant impact on the life and production of a well. Therefore, there is a continued need for cheaper, less time consuming and effective methods to select the optimal surfactant that will increase hydrocarbon production during oilfield subterranean operations and possibly extend the life of the well.

BRIEF DESCRIPTION OF THE FIGURES

FIG. 3 incorporates a plurality of longitudinal lines and a plurality of latitudinal lines to demonstrate uniformity.

DETAILED DESCRIPTION

Figure 1:
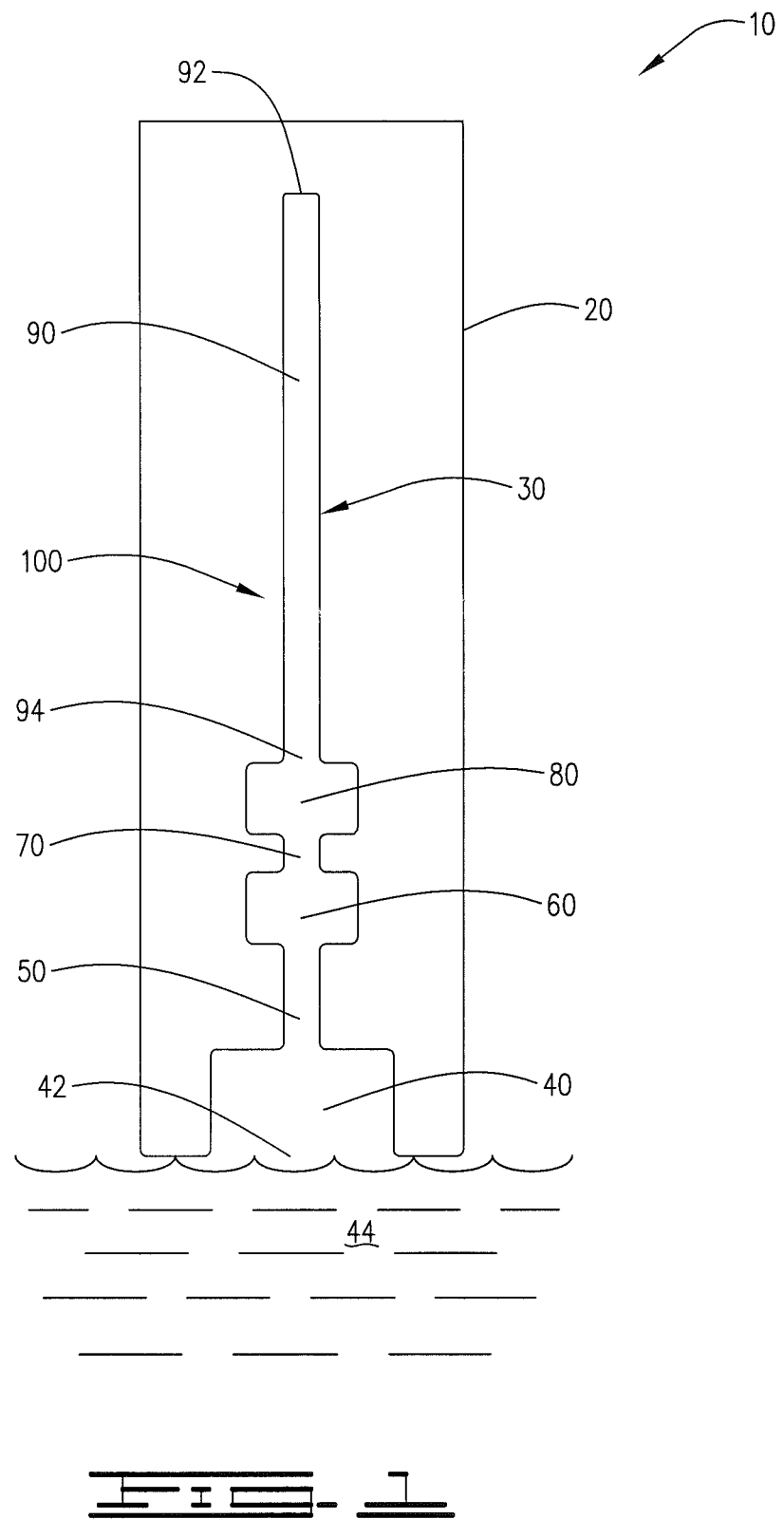
FIG. 1 is a diagram illustrating an example of a testing device having a single testing area for surfactant selection.

The present disclosure may be understood more readily by reference to the following detailed descriptions as well as to the examples included therein. For simplicity and clarity of illustration, where appropriate, reference numerals have been repeated among the different figures to indicate corresponding or analogous elements. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The methods and apparatuses herein cover the use of a fast, field deployable, disposable, inexpensive way to select the optimal surfactant for use in a particular subterranean operation. As further described in more detail below, surfactant selection depends on a combination of variables, including the formation hydrocarbon, source water and formation mineralogy.

FIG. 1 illustrates an apparatus (or testing device) 10 for surfactant selection. Testing device 10 includes a fluid wicking substrate 20. Any porous, hydrophilic substrate that wicks fluids by capillary action can be used as substrate 20 in the methods and apparatuses herein. Non-limiting examples include nitrocellulose acetate, cellulose acetate, cellulosic paper, filter paper, tissue paper, writing paper, cloth and porous polymer film. Preferably, substrate 20 is paper.

Substrate 20 is patterned with a hydrophobic barrier 30 that provides a testing area 100 by preventing wicking or capillary action from the inside of testing area 100 to the outside testing area 100. Thus, the hydrophobic barrier limits fluid transport by capillary action to within the regions barrier 30 defines. Hydrophobic barrier 30 may be patterned using photolithography of photoresist, inkjet printing, wax patterning, plasma treatment or curable polymer in order to provide a substantially fluid-impermeable barrier permeating the thickness of substrate 20.

Testing area 100 of testing device 10 includes regions in substrate 20 that can be used to perform surfactant selection. In the illustrative embodiment of FIG. 1, the testing area 100 includes a fluid entrance region 40, a plurality of assay regions 60 and 80, a plurality of passages 50 and 70, and a channel region 90.

For exemplary purposes only, the plurality of assay regions as shown in FIG. 1 includes a lower assay region 60 and an upper assay region 80. However, the testing device 10 may include more than two assay regions in series. Similarly, the plurality of passage includes a first passage 50 and a second passage 70 and may be increased depending on the number of assay regions.

Bottom end 42 of fluid entrance region 40 is devoid of barrier 30. Contacting bottom end 42 of fluid entrance region 40 with an aqueous fluid source 44 provides the aqueous fluid entry to testing area 100. Testing area 100 has a predetermined height extending from a bottom end 42 of fluid entrance region 40 and terminating at a first end 92 of a channel region 90. First passage 50 is located between, and fluidically connected with, fluid entrance 40 and lower assay region 60. Lower assay region 60 is located between, and fluidically connected with, first passage 50 and second passage 70. Second passage 70 is located between, and fluidically connected with, lower assay region 60 and upper assay region 80. Upper assay region 80 is located between, and fluidically connected with, second passage 70 and channel 90. Channel region 90 includes first end 92 and a second end 94. First end 92 of the channel region 90 terminates testing area 100, and second end 94 of channel region 90 fluidically connects to the upper assay region 80. As used herein "fluidically connected" refers to being connected such that an aqueous fluid can move by wicking or capillary action from a first region to a second region.

As shown in FIG. 1, lower assay region 60 and upper assay region 80 are equal in size, including in width and in height. First passage 50, second passage 70 and channel 90 are equal in width, but not in height with channel 90 being longer than first passage 50, which is longer than second passage 70. Fluid entrance region 40 is wider than first passage 50, second passages 70, lower assay region 60, upper assay region 80 and channel 90. Lower assay region 60 and upper assay region 80 are wider than first passage 50, second passage 70 and channel 90. Channel 90 is longer than fluid entrance region 40, first passage 50, second passage 70, lower assay region 60, and upper assay region 80. Channel 90 will typically be over half the height of testing area 100.

For example, testing device 10 can have dimensions (hereinafter "example dimensions") that include: testing area (7 cm in height); fluid entrance region 40 (1 cm in width×1 cm in height); first passage 50 (3 mm width×1 cm in height); lower assay region 60 (7 mm in width×5 mm in height); second passage 70 (3 mm width×5 mm in height); upper assay region 80 (7 mm in width×5 mm in height); and channel 90 (3 mm wide×3.5 cm in height). The foregoing provided dimensions for testing area 100 are for illustrative purposes only, and are not intended to limit testing area 100 to these dimensions.

Lower assay region 60 is suitable for the introduction of surfactant. The surfactant can include any surfactant for use in subterranean operations that may include drilling operations, stimulation treatments (e.g., fracturing treatments, acidizing treatments), and completion operations (e.g., sand control treatments), or for the following purposes, such as emulsifying agents, non-emulsifying agents, foaming agents, defoaming agents, viscosifying (e.g., gelling) agents, dispersants, wetting agents, and the like. Application of the surfactant to lower assay region 60 can occur during manufacturing of testing device 10, or at the testing location. The amount of surfactant applied to lower assay region 60 typically will vary depending on the subterranean operation but should be adequate to affect the wicking of aqueous fluid and liquid hydrocarbon in the testing area when compared to the wicking of aqueous fluid alone or with liquid hydrocarbon in a testing area without any surfactant. Typically, this will be an amount of surfactant that will substantially cover lower assay region 60. Generally, when different surfactants are being tested in multiple testing areas 100, the amount of surfactant in the lower assay regions 60 will be the same for each surfactant. However, it is within the scope of this disclosure to use the testing device 10 to test the effect of different amounts of the same or different surfactants. With respect to the testing device 10 having the example dimensions described above, an amount of solution, including surfactant, to adequately cover lower assay region 60 can be between about 20 µL-about 504.

Upper assay region 80 is suitable for the introduction of a liquid hydrocarbon (i.e. crude oil). The liquid hydrocarbon can be the same or similar to the hydrocarbon located in a particular subterranean formation. That is, the liquid hydrocarbon is representative of the hydrocarbon located in a preselected subterranean formation. Typically, application of the liquid hydrocarbon to upper assay region 80 occurs at the testing location in an amount sufficient to substantially cover upper assay region 80. Before application, it may be necessary to dilute the liquid hydrocarbon with a solvent like hexane. Generally, when different surfactants are being tested in multiple testing areas 100, the amount and composition of liquid hydrocarbons in the upper assay region 80 will be the same for each surfactant. However, it is within the scope of this disclosure to use liquid hydrocarbons in different amounts and compositions. For example, the effect of a single surfactant on varying amounts and compositions of hydrocarbons can be tested using the testing device 10. With respect to the testing device 10 having the example dimensions described above, an amount of liquid hydrocarbon, sufficient to adequately cover upper assay region 80 can be between about 20 µL-about 50 µL.

Subsequent to introducing the surfactant to lower assay region 60 and the liquid hydrocarbon to upper assay region 80, entrance region 40 can be placed in contact with an aqueous fluid source 44. The aqueous fluid source 44 may be composed of water, or an aqueous treatment fluid containing additional additives. The aqueous fluid wicks through testing area 100, contacting the surfactant at lower assay region 60, then contacting the liquid hydrocarbon at upper assay region 80 and finally wicking into the channel region. Surfactant selection depends on how far and fast the fluid wicks toward the first end (terminating end) 92 of channel 90.

Figure 2:
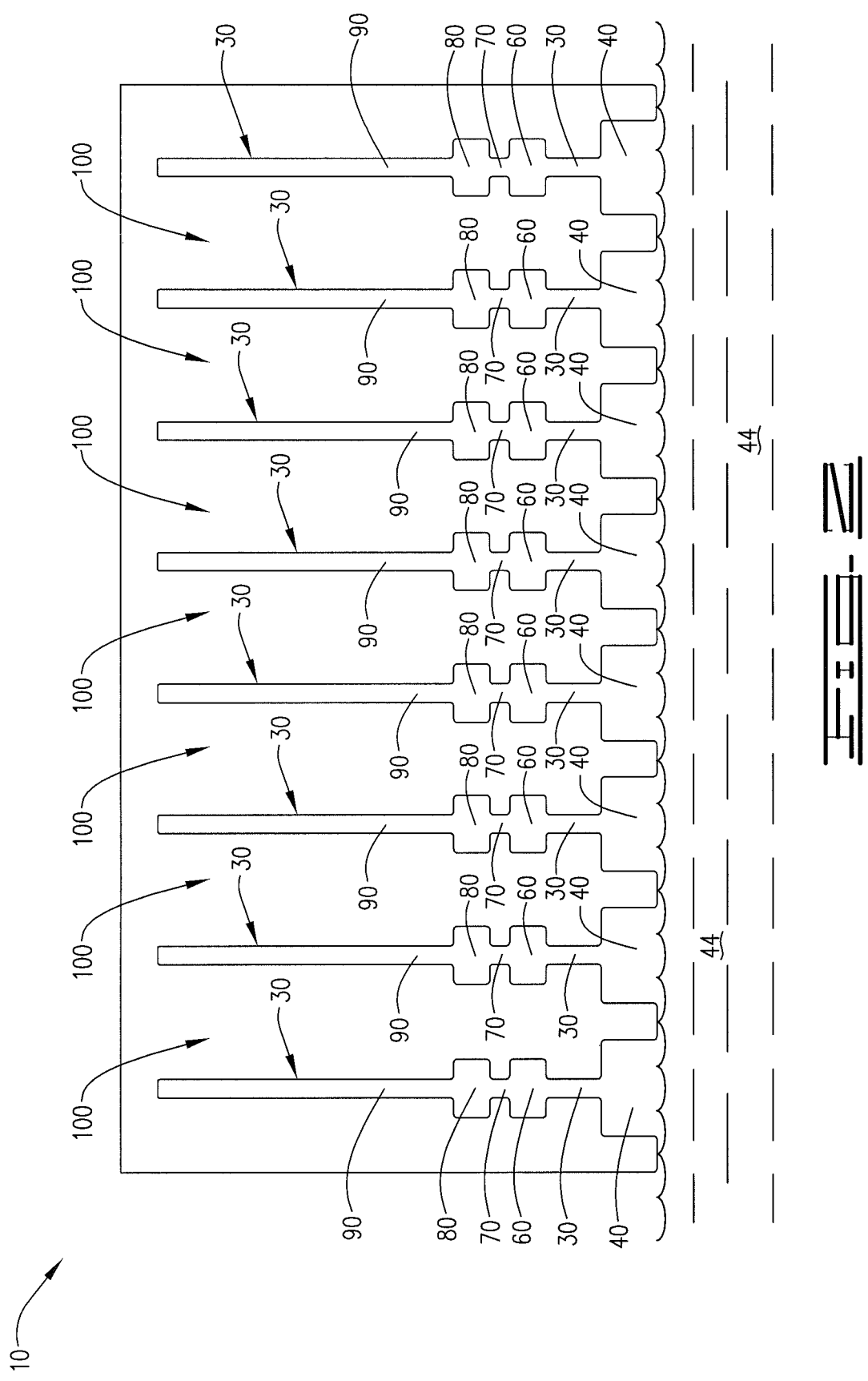
FIG. 2 is a diagram illustrating an example of a testing device having multiple testing areas for surfactant selection.

As shown in FIG. 2, substrate 20 may include a plurality of testing areas 100 patterned with hydrophobic barrier 30 to enable fluid transport by capillary action within each of testing areas 100 that barrier 30 defines. Each testing area 100 defined by barrier 30 on substrate 20 includes fluid entrance region 40, a plurality of assay regions, a plurality of passages and channel region 90. The plurality of assay regions includes lower assay region 60 and upper assay region 80. The plurality of passages include first passage 50 and second passage 70.

Each lower assay region 60 of each testing area 100 is suitable for the introduction of a different surfactant. Each upper assay region 80 of each testing area 100 is suitable for the introduction of the same liquid hydrocarbon. A plurality of testing devices 100 allows a user to contact each fluid entrance region 40 with aqueous fluid source 44 simultaneously in order to compare the effect different surfactants have on the same liquid hydrocarbon simultaneously.

Figure 3:
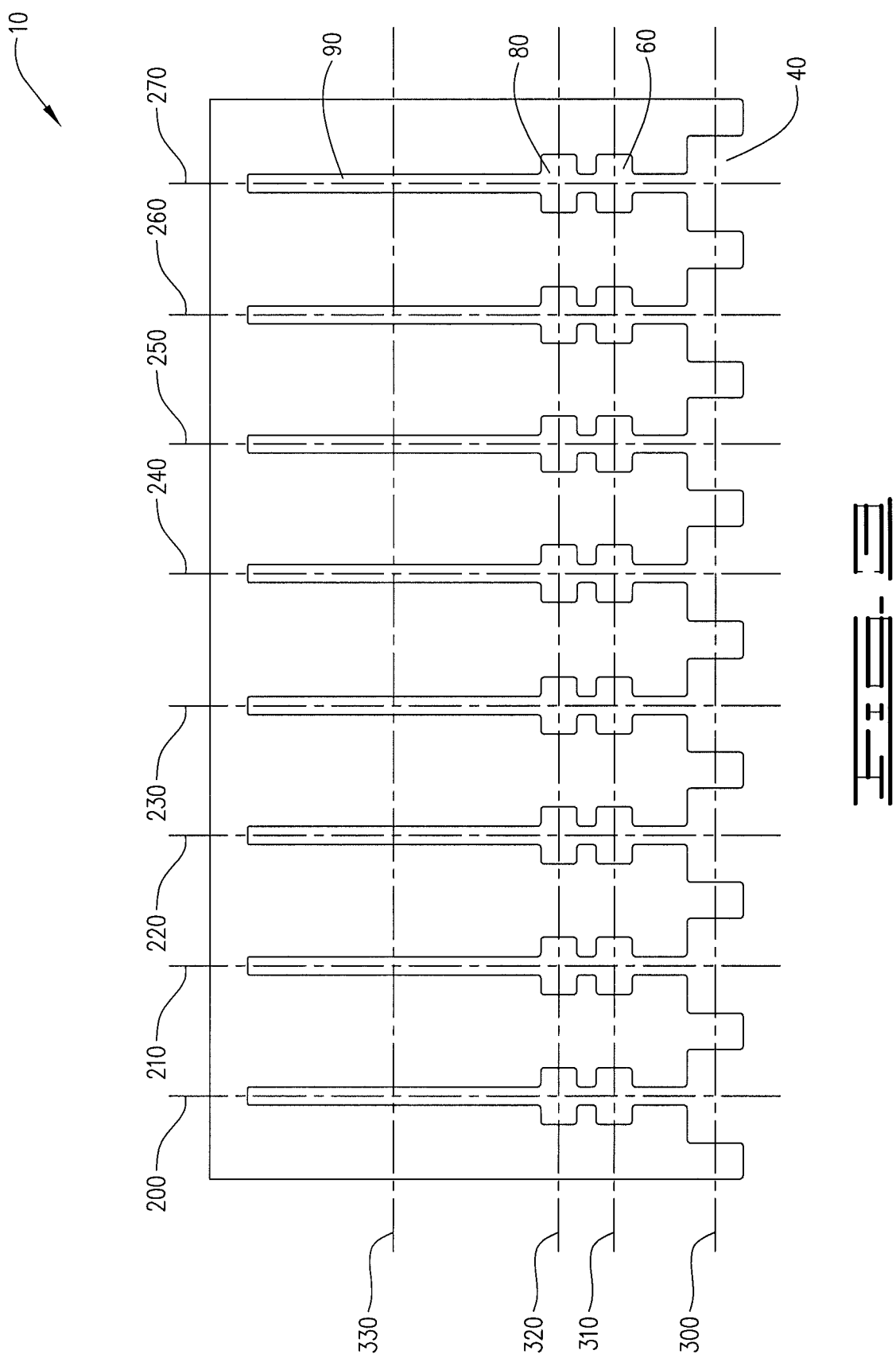
FIG. 3 is a diagram illustrating an example of a testing device having multiple testing areas.

FIG. 3 shows that each testing area 100 on substrate 20 is uniform in shape, width and height. A plurality of parallel longitudinal lines 200-270, each line associated with one of testing areas 100, demonstrate that each testing area 100 is parallel with one another. A plurality of parallel latitudinal lines 300-330 demonstrates that each testing area 100 is uniform in width and height. For example, latitudinal line 300 bisects each of the fluid entrance regions 40 uniformly, latitudinal line 310 bisects each of the lower assay regions 60 uniformly, latitudinal line 320 bisects each of the upper assay regions 80 uniformly and latitudinal line 330 bisects each of the channels 90 uniformly, and so on. Having each testing area 100 equal provides for uniform testing and surfactant selection.

Another embodiment includes a method of performing an assay to determine the suitability of a surfactant for use in a well. The method includes introducing a surfactant to lower assay region 60 of testing area 100. Application of the surfactant to lower assay region 60 can occur during manufacturing of testing device 10, or at the testing location. The amount of surfactant applied to lower assay region 60 typically will vary depending on the subterranean operation. For example, with respect to a testing device 10 having the example dimensions described above, an amount of solution, including surfactant, to adequately cover lower assay region 60 can be between about 20 µL-about 50 µL.

The method also includes introducing a liquid hydrocarbon to upper assay region 80 of testing area 100. The liquid hydrocarbon can be the same or similar to the hydrocarbon located in a particular subterranean formation. That is, the liquid hydrocarbon is representative of the hydrocarbon located in a preselected subterranean formation. Typically, application of the liquid hydrocarbon to upper assay region 80 occurs at the testing location in an amount sufficient to adequately cover upper assay region 80. For example, with respect to a testing device 10 having the example dimensions described above, an amount of liquid hydrocarbon, sufficient to adequately cover upper assay region 80 can be between about 20 µL-about 50 µL. Before application of the liquid hydrocarbon, it may be necessary to dilute the liquid hydrocarbon with a solvent like hexane.

Subsequent to introducing the surfactant to lower assay region 60 and the liquid hydrocarbon to upper assay region 80, the method includes contacting fluid entrance region 40 of testing area 100 with aqueous fluid source 44. The aqueous fluid wicks through first passage 50 to lower assay region 60 where the aqueous fluid contacts the surfactant to produce a first mixture. The first mixture further wicks through second passage 70 before contacting the liquid hydrocarbon at upper assay region 80 to produce a second mixture. The second mixture is composed of the liquid hydrocarbon, the surfactant and the aqueous fluid, but may also include other additives. For example, other additives that aid in oilfield subterranean formation operations may be included with the liquid hydrocarbon, the surfactant or the aqueous fluid. The second mixture wicks to channel region 90 where a user is able to determine the suitability of the surfactant by observing how far up channel region 90 the second mixture wicks within a predetermined period of time. Selecting the optimal surfactant for use in the well simply requires observing and choosing the second mixture that wicks furthest towards first end 92 of channel region 90 in the predetermined period of time.

Another method covers performing multiple assays at the same time to determine the suitability of a surfactant for use in a well. The method includes providing testing device 10 having multiple testing areas. The method further includes applying a different surfactant to lower assay region 60 of each testing area 100 and applying the same liquid hydrocarbon to upper assay region 80 of each testing area 100. Each fluid entrance region 40 is then simultaneously contacted with an aqueous fluid source 44. The aqueous fluid then wicks up each testing area 100 to each produce a first mixture composed of a different surfactant. Each first mixture contacts the same liquid hydrocarbon separately applied to each testing area to each create a second mixture composed of a different surfactant. The second mixture further wicks into channel region 90 of each testing area 100.

In the above methods, an oleophilic colored dye can be added to the liquid hydrocarbon before applying the liquid hydrocarbon to the upper assay region 80 for ease of pinpointing the band position. Alternatively or in addition, use of a black light or UV light can assist in visualization of light colored oil bands.

Also, the above methods may include depositing in testing area 100 formation material from a subterranean formation. The formation material includes minerals and organic material located in the subterranean formation.

Figure 4:
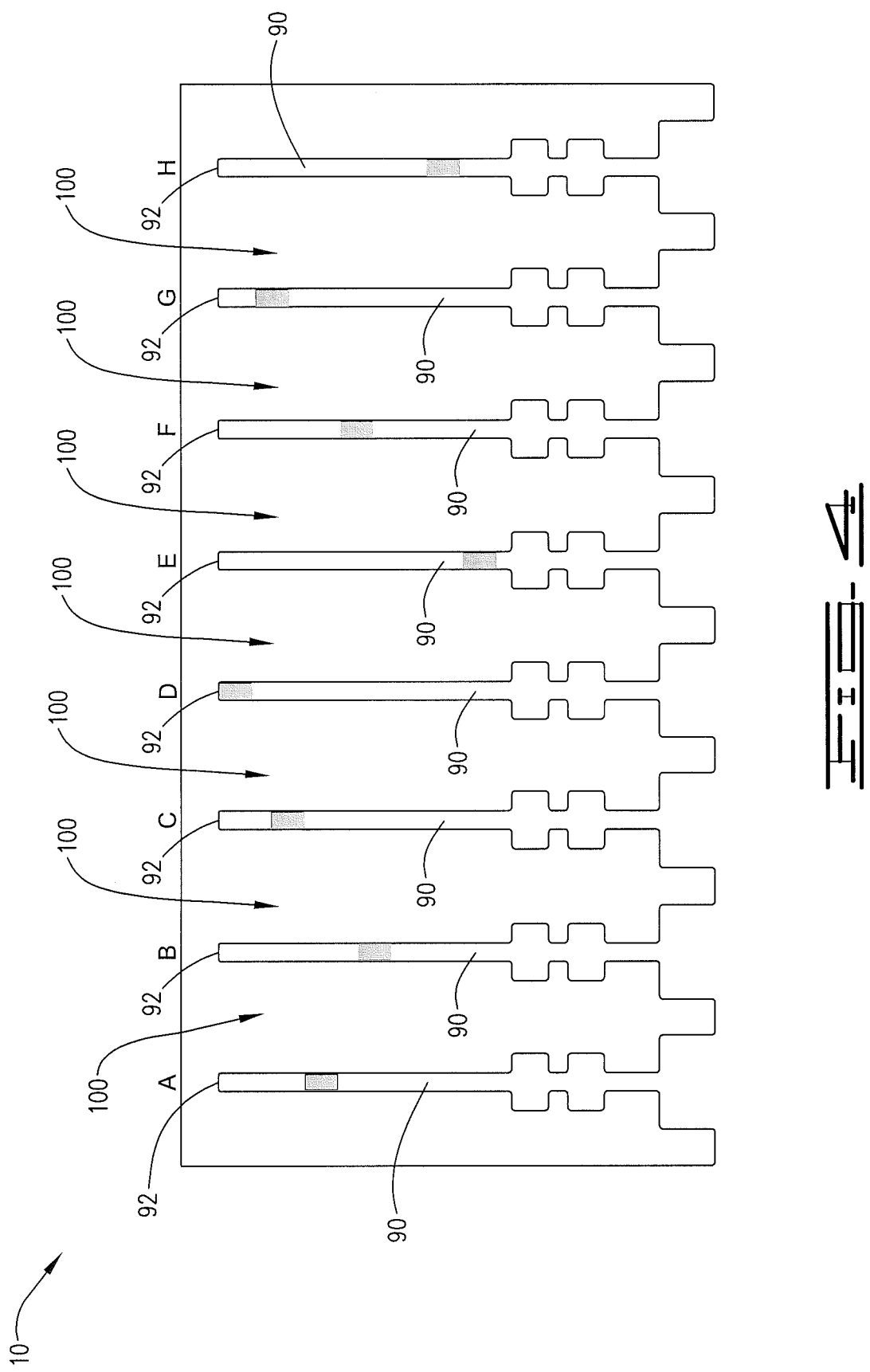
FIG. 4 is a diagram illustrating an example of results of an assay test using a testing device having multiple testing areas.

FIG. 4 shows a testing device having multiple testing areas 100 designated by letters A-H. Each testing area 100 demonstrates the results after the second mixture wicks to channel region 90 after a predetermined period of time. The second mixture of each testing area 100 reaches a different channel 90 height depending on the surfactant applied to each lower assay region 60. A user of the testing device 10 selects the optimal surfactant for use in the well by comparing how far the second mixture travels up each channel region 90 of each testing area 100. Selecting the optimal surfactant requires the user to select the second mixture that reaches nearest the first end 92 of channel region 90. Of the testing areas A-H, the second mixture of testing area D wicked nearest second end 92 of channel 90. Thus, the surfactant applied to testing area D will prove most suitable for use in the well.

The surfactant selected can then be used in a downhole operation such as drilling operations, stimulation treatments (e.g., fracturing treatments, acidizing treatments), and completion operations (e.g., sand control treatments). In use, the surfactant chosen may directly or indirectly effect one or more components or pieces of equipment associated with the downhole operation.

Figure 5:
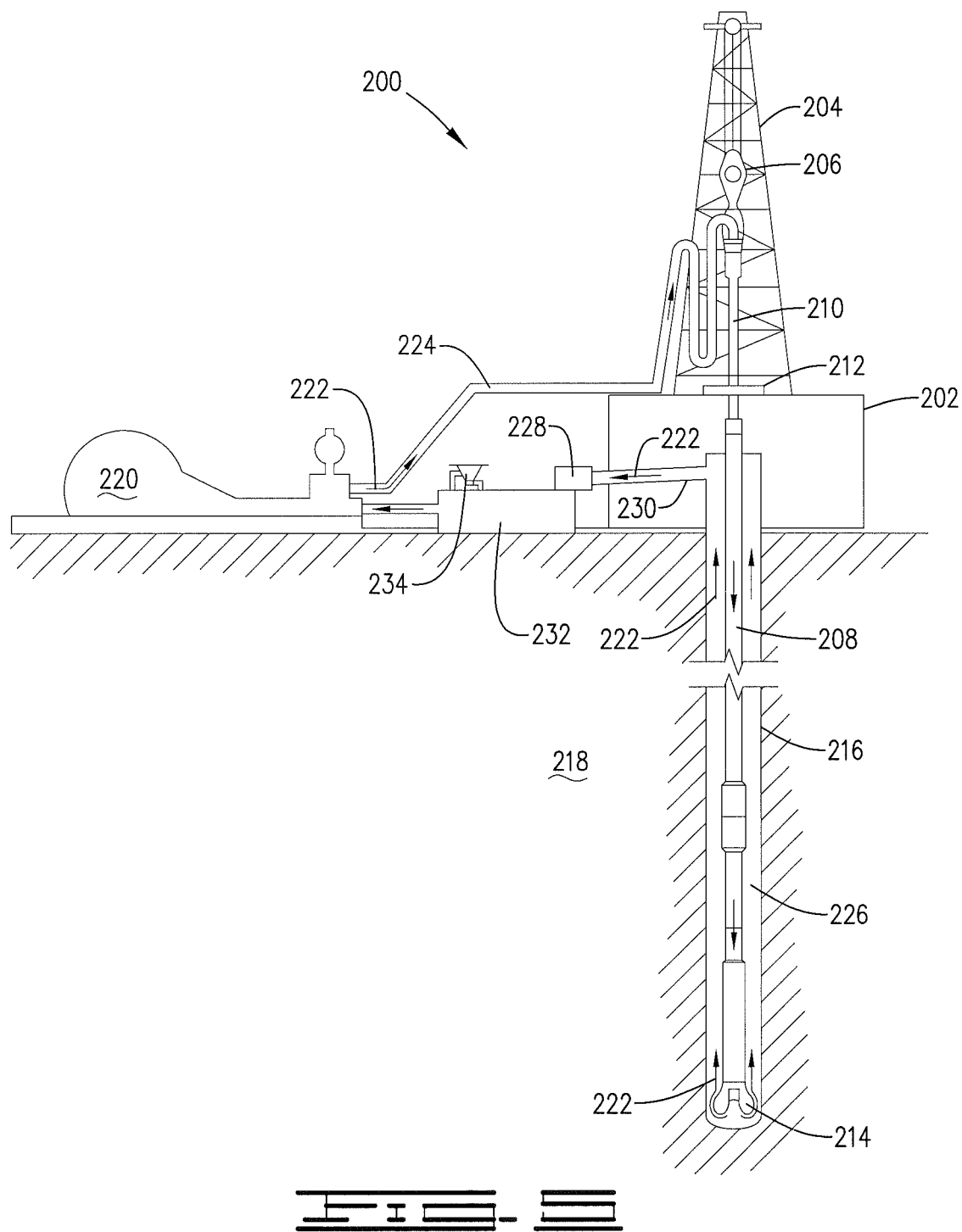
FIG. 5 generally depicts a land-based drilling assembly in which surfactants might be used.

For example, the surfactant can be used in a drilling operation and may directly or indirectly affect one or more components or pieces of equipment associated with the preparation, delivery, recapture, recycling, reuse, and/or disposal of the selected surfactant. For example, and with reference to FIG. 5, the selected surfactant may directly or indirectly affect one or more components or pieces of equipment associated with an exemplary wellbore drilling assembly 200, according to one or more embodiments. It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 200 may include a drilling platform 202 that supports a derrick 204 having a traveling block 206 for raising and lowering a drill string 208. Drill string 208 may include, but is not limited to, drill pipe and coiled tubing, as generally known to those skilled in the art. A kelly 210 supports drill string 208 as it is lowered through a rotary table 212. A drill bit 214 is attached to the distal end of drill string 208 and is driven either by a downhole motor and/or via rotation of drill string 208 from the well surface. As drill bit 214 rotates, it creates a borehole 216 that penetrates various subterranean formations 218.

A pump 220 (e.g., a mud pump) circulates drilling fluid 222 through a feed pipe 224 and to kelly 210, which conveys drilling fluid 222 downhole through the interior of drill string 208 and through one or more orifices in drill bit 214. Drilling fluid 222 then circulates back to the surface via an annulus 226 defined between drill string 208 and the walls of borehole 216. At the surface, the recirculated or spent drilling fluid 222 exits annulus 226 and may be conveyed to one or more fluid processing unit(s) 228 via an interconnecting flow line 230. After passing through fluid processing unit(s) 228, a "cleaned" drilling fluid 222 is deposited into a nearby retention pit 232 (i.e., a mud pit). While illustrated as being arranged at the outlet of borehole 216 via annulus 226, those skilled in the art will readily appreciate that fluid processing unit(s) 228 may be arranged at any other location in drilling assembly 200 to facilitate its proper function, without departing from the scope of the disclosure.

The selected surfactant may be added to drilling fluid 222 via a mixing hopper 234 communicably coupled to or otherwise in fluid communication with retention pit 232. Mixing hopper 234 may include, but is not limited to, mixers and related mixing equipment known to those skilled in the art. In other embodiments, however, the selected surfactant may be added to drilling fluid 222 at any other location in drilling assembly 200. In at least one embodiment, for example, there could be more than one retention pit 232, such as multiple retention pits 232 in series. Moreover, retention pit 232 may be representative of one or more fluid storage facilities and/or units where the selected surfactant may be stored, reconditioned, and/or regulated until added to drilling fluid 222.

As mentioned above, the selected surfactant may directly or indirectly affect the components and equipment of drilling assembly 200. For example, the selected surfactant may directly or indirectly affect fluid processing unit(s) 228 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. Fluid processing unit(s) 128 may further include one or more sensors, gauges, pumps, compressors, and the like used to store, monitor, regulate, and/or recondition the selected surfactant.

The selected surfactant may directly or indirectly affect pump 220, which representatively includes any conduits, pipelines, trucks, tubulars, and/or pipes used to fluidically convey the surfactant downhole, any pumps, compressors, or motors (e.g., topside or downhole) used to drive the surfactant into motion, any valves or related joints used to regulate the pressure or flow rate of the surfactant, and any sensors (i.e., pressure, temperature, flow rate, etc.), gauges, and/or combinations thereof, and the like. The selected surfactant may also directly or indirectly affect mixing hopper 234 and retention pit 232 and their assorted variations.

The selected surfactant may also directly or indirectly affect the various downhole equipment and tools that may come into contact with the surfactant such as, but not limited to, drill string 208, any floats, drill collars, mud motors, downhole motors and/or pumps associated with drill string 208, and any MWD/LWD tools and related telemetry equipment, sensors or distributed sensors associated with drill string 208. The selected surfactant may also directly or indirectly affect any downhole heat exchangers, valves and corresponding actuation devices, tool seals, packers and other wellbore isolation devices or components, and the like associated with wellbore 216. The selected surfactant may also directly or indirectly affect drill bit 214, which may include, but is not limited to, roller cone bits, PDC bits, natural diamond bits, any hole openers, reamers, coring bits, etc.

While not specifically illustrated herein, the selected surfactant may also directly or indirectly affect any transport or delivery equipment used to convey the surfactant to drilling assembly 200 such as, for example, any transport vessels, conduits, pipelines, trucks, tubulars, and/or pipes used to fluidically move the surfactant from one location to another, any pumps, compressors, or motors used to drive the surfactant into motion, any valves or related joints used to regulate the pressure or flow rate of the surfactant, and any sensors (i.e., pressure and temperature), gauges, and/or combinations thereof, and the like.

According to the description above, various embodiments will now be described. According to one set of embodiments there is provided an apparatus comprising: a fluid wicking substrate, and a fluid-impermeable barrier permeating the thickness of the substrate. The barrier defines a testing area of the substrate devoid of the barrier. The testing area has a fluid entrance region, a plurality of assay regions in series and a channel region. The plurality of assay regions is between the channel region and the fluid entrance region. When the testing device contacts an aqueous fluid source, the substrate wicks the aqueous fluid from the fluid entrance region to the channel region. This capillary action is due to the channel region relation to the lower assay region and upper assay region such that a combination of the surfactant and the liquid hydrocarbon can wick into the channel region.

The substrate, of the testing device, may be composed of nitrocellulose acetate, cellulose acetate, cellulosic paper, filter paper, tissue paper, writing paper, cloth and porous polymer film.

The fluid-impermeable barrier can be patterned using either photolithography of photoresist, inkjet printing, wax patterning, plasma treatment and curable polymer.

In another embodiment, the plurality of assay regions comprises a lower assay region and an upper assay region and the lower assay region is suitable for the introduction of a surfactant. While the upper assay region is suitable for the introduction of a liquid hydrocarbon.

In still another embodiment, the barrier may define a plurality of the testing areas. The plurality of the testing areas is configured such that each of the fluid entrance regions of each of the testing areas can be placed into fluid communication with an aqueous fluid simultaneously.

When a testing device has multiple testing areas, the testing areas are uniform; that is each testing area is equal to one another in shape, width and height. For each testing area, the fluid entrance region, assay regions and channel regions can lie on a longitudinal line; thus, there are a plurality of longitudinal lines with each line being associated with one of the testing areas. The plurality of longitudinal lines are parallel to each other. Each testing area has a height extending from the fluid entrance to a first end of the channel region. The first end terminating the testing area, and the plurality of testing areas are uniform in shape so that the height of all the testing areas are equal.

In another embodiment, for each testing area, the plurality of assay regions each comprise at least a lower assay region having a width and an upper assay region having a width equal to the width of the lower assay region. For each testing area, a different surfactant from a group of surfactants is introduced to each of the lower assay regions and the same liquid hydrocarbon is introduced to each of the upper assay regions. The fluid entrance regions of all the testing areas are uniform so that they can be in fluid communication with an aqueous fluid source simultaneously.

In still another embodiment, for each testing area, the channel region has a second end and a width. The second end of the channel region fluidically connects to the upper assay region and the width of the upper assay region is wider than the width of the channel region.

In another embodiment, each testing area can comprise a first passage and a second passage. The first passage and the second passage each have a width equal to the width of the channel region. The first passage is between the fluid entrance and the lower assay region, and the second passage is between the lower assay region and the upper assay region. In addition, the fluid entrance region has a width, and the width of the first passage, second passage and channel are narrower than the width of the fluid entrance region.

In still another embodiment the testing device may include a fluid wicking substrate defining a testing area having a fluid entrance region fluidically connected to a first passage. The first passage has a height and is fluidically connected to a lower assay region. The lower assay region is fluidically connected to a second passage. The second passage also has a height and is fluidically connected to a upper assay region. The upper assay region is fluidically connected to a channel region. The channel region has a uniform width and has a height extending longer than the height of the first passage and second passage. The first passage is located between the fluid entrance region and the lower assay region. While the second passage is located between the lower assay region and the upper assay region.

According to the various embodiments described above, there is provided a method of using the apparatus to perform an assay to determine the suitability of a surfactant for use in a well comprising:

(a) introducing a surfactant to a lower assay region of a testing area;
(b) introducing a liquid hydrocarbon to an upper assay region of the testing area;
(c) contacting the testing area with an aqueous fluid source at an entrance region of the testing area;
(d) allowing the fluid to wick to the lower assay region and contact the surfactant to produce a first mixture comprising the surfactant and the aqueous fluid;
(e) allowing the first mixture to further wick to the upper assay region such that the first mixture contacts the liquid hydrocarbon to produce a second mixture comprising the liquid hydrocarbon, the surfactant and the aqueous fluid;
(f) allowing the second mixture to wick to a channel region; and
(g) determining the suitability of the surfactant by observing how far up the channel region the second mixture wicks within a predetermined period of time.

In another embodiment, the method may provide a testing device having multiple testing areas and step (a) includes introducing a different surfactant from a group of surfactants to the lower assay region of each testing area. Step (b) can comprise introducing the same liquid hydrocarbon to the upper assay region of each testing area. Step (c) can comprise contacting simultaneously the fluid entrance region of each testing area with the aqueous fluid source. Step (d) can comprise allowing the aqueous fluid source to wick to the lower assay region of each testing area and to contact the different surfactants to produce the first mixture for each testing area comprising the different surfactants and the aqueous fluid. Step (e) can comprise allowing the first mixture of each testing area to further wick to the upper assay region of the testing area associated with the first mixture such that the first mixture contacts the liquid hydrocarbon to produce the second mixture comprising the liquid hydrocarbon, the different surfactants and the aqueous fluid. Step (f) can comprise allowing the second mixture of each testing area to wick to the channel region of the testing area associated with the second mixture. Step (g) can comprise comparing how far the second mixture travels up the channel region of each testing area to determine which surfactant from the group of surfactants is most suitable for use in the well. The method can further comprise, prior to step (c), depositing on the testing area formation material from a subterranean formation. Lastly, the method can also comprise selecting the surfactant that is determined to be most suitable for use in the well as a selected surfactant and using the selected surfactant in a downhole process.

The present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. An apparatus comprising:
 a fluid wicking substrate;
 a fluid-impermeable barrier permeating the thickness of the substrate; and
 at least one testing area defined by the fluid-impermeable barrier such that the fluid-impermeable barrier prevents wicking of fluid from inside the testing area to outside the testing area, the testing area further comprising:
   a fluid entrance region;
   a plurality of assay regions in series; and
   a channel region, wherein the plurality of assay regions are between the channel region and the fluid entrance region and wherein the substrate wicks fluid such that the channel region is fluidically connected to the plurality of assay regions and the fluid entrance region such that fluid introduced to the fluid entrance region must wick through the plurality of assay regions prior to wicking into the channel region.

2. The apparatus of claim 1, in which the fluid entrance region is devoid of a barrier so as to allow aqueous fluid entry to the testing area when the fluid entrance region is in fluid communication with an aqueous fluid source.

3. The apparatus of claim 1, in which plurality of assay regions consists of a lower assay region and an upper assay region; the lower assay region is configured to receive a surfactant; and the upper assay region is configured to receive a liquid hydrocarbon.

4. The apparatus of claim 3, in which the channel region is connected to the lower assay region and upper assay region such that a combination of the surfactant and the liquid hydrocarbon can wick into the channel region by surfactant from the lower assay region wicking through the upper assay region and combining with surfactant in the upper assay region with the combination wicking into the channel region.

5. The apparatus of claim 1, in which the fluid-impermeable barrier defines a plurality of testing areas; and wherein each of the fluid entrance regions of each of the testing areas can be placed into fluid communication with an aqueous fluid simultaneously.

6. The apparatus of claim 5, in which each testing area has an associated longitudinal line with the fluid entrance region, assay regions and channel region uniformly lying on the associated longitudinal line; and wherein the testing areas are aligned such that the longitudinal lines are parallel to each other.

7. The apparatus of claim 6, in which each testing area is uniform in shape and each testing area has a height extending from the fluid entrance to a first end of the channel region; the first end terminates the testing area; and, the plurality of assay regions each comprise at least a lower assay region having a width and an upper assay region having a width equal to the width of the lower assay region.

8. The apparatus of claim 7, in which the channel region is connected to the lower assay region and upper assay region such that a combination of the surfactant and the liquid hydrocarbon can wick into the channel region by surfactant from the lower assay region wicking through the upper assay region and combining with surfactant in the upper assay region with the combination wicking into the channel region.

9. The apparatus of claim 8, in which each of the fluid entrance regions are devoid of a barrier so as to allow aqueous fluid entry to the testing area when the fluid entrance region is in fluid communication with an aqueous fluid source simultaneously.

10. The apparatus of claim 9, in which;
for each testing area, the channel region has a second end and a width with the second end of the channel region fluidically connecting to the upper assay region;
the width of the upper assay region is wider than the width of the channel region; and
each testing area further comprises a first passage and a second passage, wherein:
the first passage and the second passage each have a width equal to the width of the channel region;
the first passage is between the fluid entrance and the lower assay region;
the second passage is between the lower assay region and the upper assay region;
the fluid entrance region has a width; and
the width of the first passage, second passage and channel are narrower than the width of the fluid entrance region.

11. An apparatus comprising:
a fluid wicking substrate patterned with a hydrophobic barrier which defines at least one testing area having a fluid entrance region, a first passage, a lower assay region, a second passage, an upper assay region, and a channel region, wherein the fluid entrance region is fluidically connected to the first passage, and wherein the hydrophobic barrier prevents wicking of fluid from inside the testing area to outside the testing areas; wherein:
the first passage having a height, wherein the first passage is fluidically connected to the lower assay region;
the lower assay region is fluidically connected to the second passage;
the second passage having a height, wherein the second passage is fluidically connected to the upper assay region;
the upper assay region is fluidically connected to the channel region;
the channel region has a uniform width and has a height extending longer than the height of the first passage and second passage;
the first passage is located between the fluid entrance region and the lower assay region; and
the second passage is located between the lower assay region and the upper assay region.

12. The apparatus of claim 11, in which the channel region has a first end and a second end, the first end of the channel region terminates the testing area, and the second end of the channel region fluidically connects to the upper assay region.

13. The apparatus of claim 12, in which the first passage has a width, the second passage has a width, the fluid entrance region has a width, the lower assay region has a width, and the upper assay region has a width; and wherein:
the width of the first passage is narrower than the width of the fluid entrance region and the width of the lower assay region;
the width of the second passage is narrower than the width of the lower assay region, and the width of upper assay region, and
the width of the channel region is narrower than width of the upper assay region.

14. The apparatus of claim 13, in which the fluid wicking substrate defines a plurality of the testing areas, and wherein the plurality of the testing areas are configured such that the fluid entrance region of each of the testing areas can be placed into fluid communication with an aqueous fluid source simultaneously.

15. The apparatus of claim 14, in which each testing area has an associated longitudinal line with the fluid entrance region, assay regions and channel region uniformly lying on the associated longitudinal line; and wherein the testing areas are aligned such that the longitudinal lines are parallel to each other.

16. A method of performing an assay to determine the suitability of a surfactant for use in a well comprising:
(a) introducing a surfactant to a lower assay region of a testing area;
(b) introducing a liquid hydrocarbon to an upper assay region of the testing area;
(c) contacting the testing area with an aqueous fluid source at an entrance region of the testing area;
(d) allowing the fluid to wick to the lower assay region and contact the surfactant to produce a first mixture comprising the surfactant and the aqueous fluid;
(e) allowing the first mixture to further wick to the upper assay region such that the first mixture contacts the liquid hydrocarbon to produce a second mixture comprising the liquid hydrocarbon, the surfactant and the aqueous fluid;
(f) allowing the second mixture to wick to a channel region; and
(g) determining the suitability of the surfactant by observing how far up the channel region the second mixture wicks within a predetermined period of time.

17. The method of claim 16, further comprising:
providing a testing device having multiple testing areas; wherein step (a) comprises introducing a different surfactant from a group of surfactants to the lower assay region of each testing area and step (b) comprises introducing the same liquid hydrocarbon to the upper assay region of each testing area.

18. The method of claim 17, in which:
step (c) comprises contacting simultaneously the fluid entrance region of the each testing area with the aqueous fluid source;
step (d) comprises allowing the aqueous fluid source to wick to the lower assay region of each testing area and to contact the different surfactant to produce the first mixture for each testing area comprising the different surfactant and the aqueous fluid;
step (e) comprises allowing the first mixture of each testing area to further wick to the upper assay region of the testing area associated with the first mixture such that the first mixture contacts the liquid hydrocarbon to produce the second mixture comprising the liquid hydrocarbon, the different surfactant and the aqueous fluid;
step (f) comprises allowing the second mixture of each testing area to wick to the channel region of the testing area associated with the second mixture; and
step (g) comprises comparing how far the second mixture travels up the channel region of each testing area to determine which surfactant from the group of surfactants is most suitable for use in the well.

19. The method of claim 18, further comprising, prior to step (c), depositing on the testing area formation material from a subterranean formation.

20. The method of claim 18, further comprising:
selecting the surfactant that is determined to be most suitable for use in the well as a selected surfactant; and
using the selected surfactant in a downhole process.

* * * * *

UNITED STATES PATENT AND TRADEMARK OFFICE
CERTIFICATE OF CORRECTION

PATENT NO. : 10,634,597 B2
APPLICATION NO. : 15/544231
DATED : April 28, 2020
INVENTOR(S) : Scott Anthony Klasner et al.

It is certified that error appears in the above-identified patent and that said Letters Patent is hereby corrected as shown below:

In the Specification

Column 3, Line 43, delete "504" and replace with --50µL--

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*